US006401560B1

(12) United States Patent
Sato

(10) Patent No.: US 6,401,560 B1
(45) Date of Patent: Jun. 11, 2002

(54) SHIFT MECHANISM OF OUTBOARD ENGINE

(75) Inventor: Takuya Sato, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 10 days.

(21) Appl. No.: 09/606,981

(22) Filed: Jun. 29, 2000

(30) Foreign Application Priority Data

Sep. 30, 1999 (JP) ........................................... 11-280757

(51) Int. Cl.[7] ......................... F16H 59/02; F16H 63/38; B63H 23/08

(52) U.S. Cl. ....................... 74/337.5; 74/378; 74/473.1; 74/473.27; 192/51; 192/93 R; 440/75

(58) Field of Search ................................ 74/337.5, 378, 74/379, 473.1, 473.27; 192/51, 93 R; 440/75

(56) References Cited

U.S. PATENT DOCUMENTS 2,718,792 A * 9/1955 Kiekhaefer .................. 74/378
3,455,420 A * 7/1969 Blanchard, Jr. .............. 192/51
3,919,964 A * 11/1975 Hagen ......................... 440/75
4,223,773 A * 9/1980 Croisant et al. ......... 192/48.91
4,527,441 A * 7/1985 Nakahama ................... 74/378
4,579,204 A * 4/1986 Iio .............................. 192/21
5,006,084 A * 4/1991 Handa ......................... 440/75
5,059,144 A * 10/1991 Onoue ......................... 440/75

FOREIGN PATENT DOCUMENTS

JP 09216600 8/1997
JP 10-114299 * 5/1998
JP 11165695 6/1999

* cited by examiner

*Primary Examiner*—Allan D. Herrmann
(74) *Attorney, Agent, or Firm*—Morrison Law Firm

(57) ABSTRACT

A shift mechanism of an outboard engine has a shift cam which is remotely-operable to effect change-over of the direction of rotation of a propeller shaft in a gear case. A shift cam support member is a member separate from and detachably secured to the gear case. The shift mechanism permits use of a single design of the gear case adapted to either a rotary shift cam or a vertically-movable shift cam.

5 Claims, 8 Drawing Sheets

SHIFT MECHANISM OF OUTBOARD ENGINE

BACKGROUND OF THE INVENTION

1. Field of the Invention

The present invention relates to a shift mechanism of an outboard engine.

2. Description of the Related Art

A conventional outboard engine has a shift mechanism which is remotely-operable to change the direction of rotation of a propeller shaft between “forward” and “reverse” passing through a “neutral” state in the process. To enable such a change-over of direction of rotation, the propeller shaft has a push rod incorporated therein. The push rod is moved back and forth to bring a shift dog into and out of engagement with the propeller shaft. This arrangement is generally known as a “shift-in and shift-out” structure. A shift cam is typically used as means for effecting the back-and-forth movement of the push rod.

The shift cam has a cam profile which is defined by three curved recesses that are smoothly connected one to another. These three recesses correspond to three shift positions, i.e., the “forward”, “reverse” and “neutral” states, of the shift mechanism. The above-mentioned push rod is normally spring-biased towards the cam, so as to rest in one of the three recesses, thus selecting one of the three shift positions.

There are two types, of the shift cam: a vertically-movable shift cam which moves up and down to bring different recesses into engagement with the push rod; and a rotational shift cam which rotates within a horizontal plane. The rotational shift cam imparts to the operator a better feel of manipulation and is used mainly for large-sized outboard engines.

The shift cam is supported by a shift cam support portion which is disposed in, and formed integrally with, a gear case, regardless of the type of the shift cam.

The rotational shift cam and the vertically-movable shift cam have different structures and, hence, require different designs of the shift cam supporting structure. This means that one design of the gear case cannot be used commonly both for the rotational shift cam and the vertically-movable shift cam, due to the difference of the design of the shift cam supporting structure which is formed integrally with the gear case. Thus, manufacturers are obliged to prepare two types of gear case of different designs. This in turn requires troublesome work for the administration of the gear cases in the production process.

For instance, the following problems are encountered due to the difference between the two types of the shift cam. A vertically-movable shift cam is generally provided with a link mechanism in an engine room covered by an engine cover. It may be impossible to find space for accommodating such a link mechanism within the engine room, due to, for example, a change in the design specifications of the outboard engine. One solution to this problem could be to replace the vertically-movable shift cam with a rotational shift cam which does not require any link mechanism such as that used for the vertically-movable shift cam. This solution, however, imposes additional cost due to the necessity for a gear case which is designed exclusively for the rotary shift cam.

In general, the shift cam supporting portion is formed on the innermost portion of a gear case. This makes it difficult to mount and demount the shift cam.

OBJECTS AND SUMMARY OF THE INVENTION

In view of the foregoing, it is an object of the present invention to provide a shift mechanism of an outboard engine which permits the use of a single type of gear case either with a vertically-movable shift cam or a rotational shift cam.

To this end, according to the present invention, there is provided a shift mechanism of an outboard engine, comprising: a remotely-operable shift cam for effecting change-over of the direction of rotation of a propeller shaft within a gear case; and a shift cam support member disposed in the gear case and detachably secured to the gear case and supporting the shift cam.

The shift cam support member may be a forward gear bearing housing for holding a bearing which supports a forward driven gear.

Alternatively, the shift cam support member may be a shift cam housing which is a member formed separately from and detachably secured to the gear case.

The shift mechanism may further comprise a detent mechanism provided on the shift cam support member.

The shift mechanism may also further comprise a bearing which is provided in the shift cam housing and which supports a shift rod for rotating the shift cam.

Preferably, the shift cam mechanism has been assembled by inserting the shift cam housing together with the shift can mounted therein, forwardly into the gear case and detachably securing the shift cam housing to the gear case.

The above and other objects, features and advantages of the present invention will become clear from the following description of a preferred embodiment with reference to the accompanying drawings.

DESCRIPTION OF THE PREFERRED EMBODIMENT

Preferred embodiments of the present invention will be described with reference to the accompanying drawings.

Figure 1:
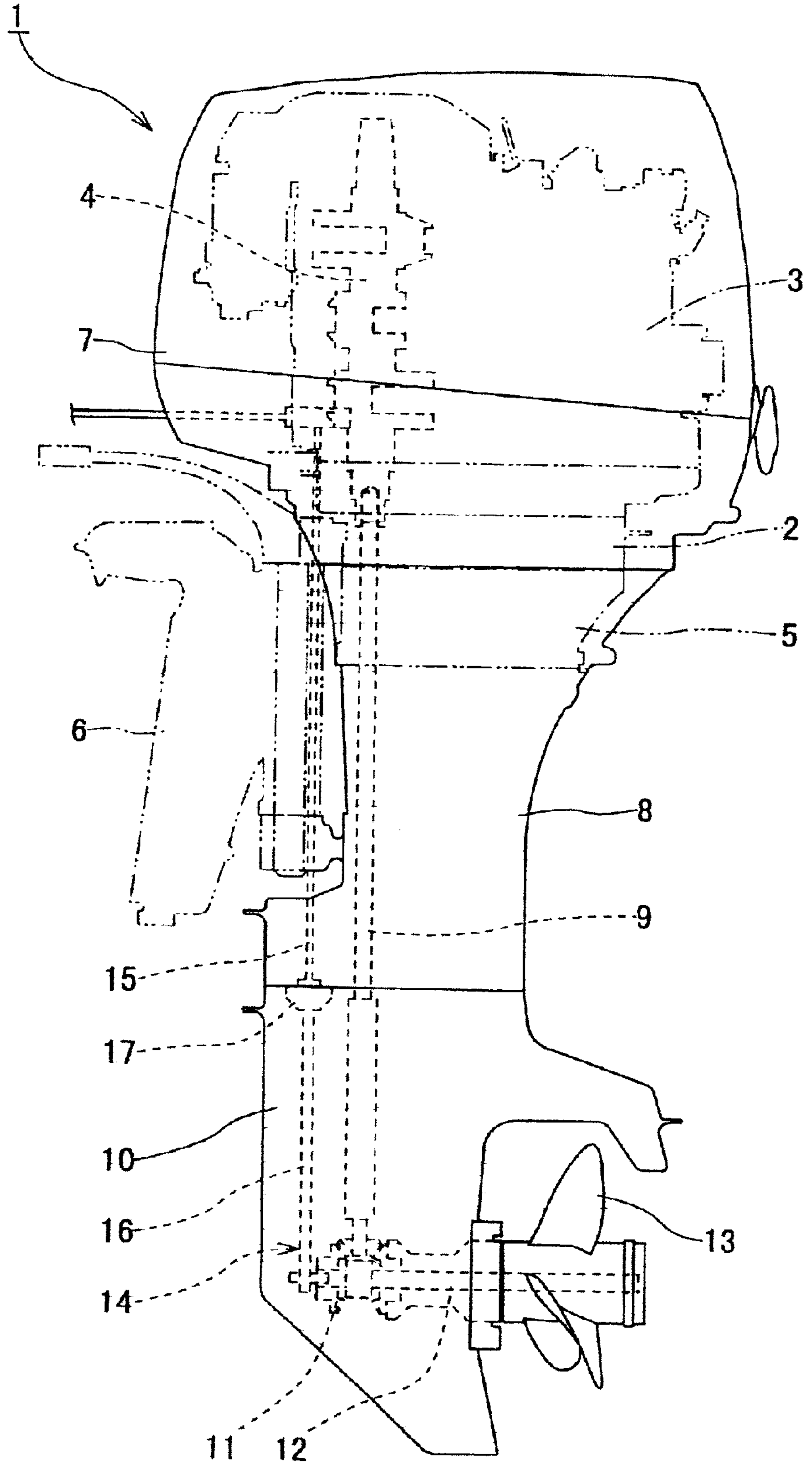
FIG. 1 is a side view of an outboard engine incorporating an embodiment of the shift mechanism of the present invention, as viewed from the port side, with certain internal elements shown in dashed line.

Referring first to FIG. 1 an outboard engine, shown generally at 1, has an engine holder 2 on which is mounted an engine unit 3. The engine unit 3 is a so-called vertical engine with a crankshaft 4 extending substantially vertically.

An oil pan 5 is disposed beneath the engine holder 2. A clamp bracket 6, attached to the engine holder 2 for example, clamps to a transom of the boat’s hull (not shown), whereby the outboard engine 1 is secured to the hull. The engine unit 3 and the engine holder 2 are covered by an engine cover 7.

A drive shaft housing 8 is provided below the oil pan 5. A drive shaft 9 extends substantially vertically through the engine holder 2, oil pan 5 and the drive shaft housing 8. The drive shaft 9 is connected at its upper end to the lower end of the crankshaft 4. The drive shaft 9 extending downward through the drive shaft housing 8 drives, through bevel gears 11 disposed in a gear case 10 under the drive shaft housing 8 and through a propeller shaft 12, a propeller 13 which propels a boat or the like.

The outboard engine 1 is provided with a remote-controlled shift mechanism 14 in the four embodiments of the invention. The embodiments are detailed in 14A (first embodiment of FIG. 3), 14B (second embodiment of FIG. 4), 14C (third embodiment of FIG. 5), or 14D (fourth embodiment of FIG. 7). The remote-controlled shift mechanism 14 effects change-over of the direction of rotation of the propeller shaft 12 from "forward" to "reverse" via a "neutral" state, and vice versa.

Figure 2:
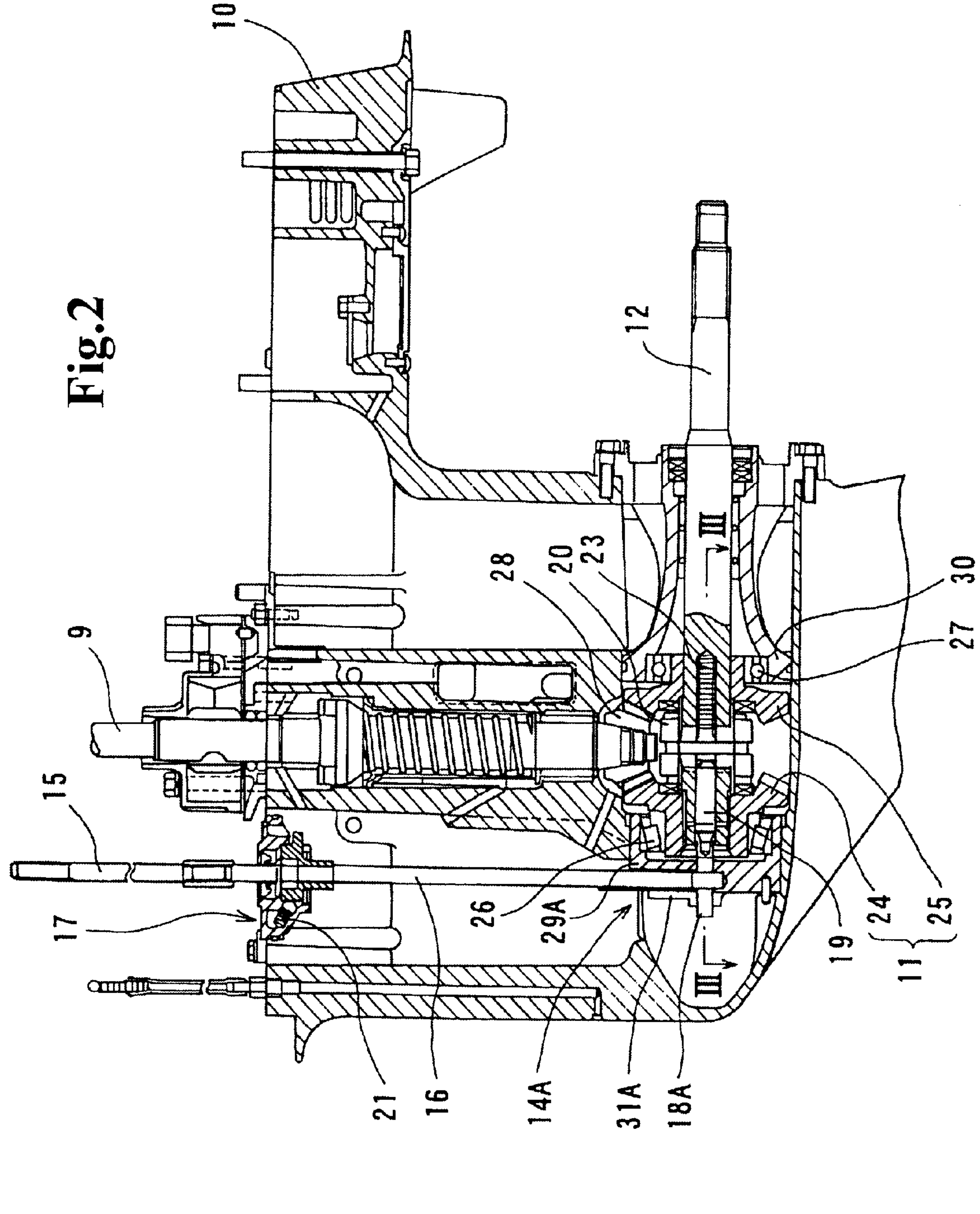
FIG. 2 is an enlarged sectional view of a gear case used in the embodiment of FIG. 1.
Figure 3:
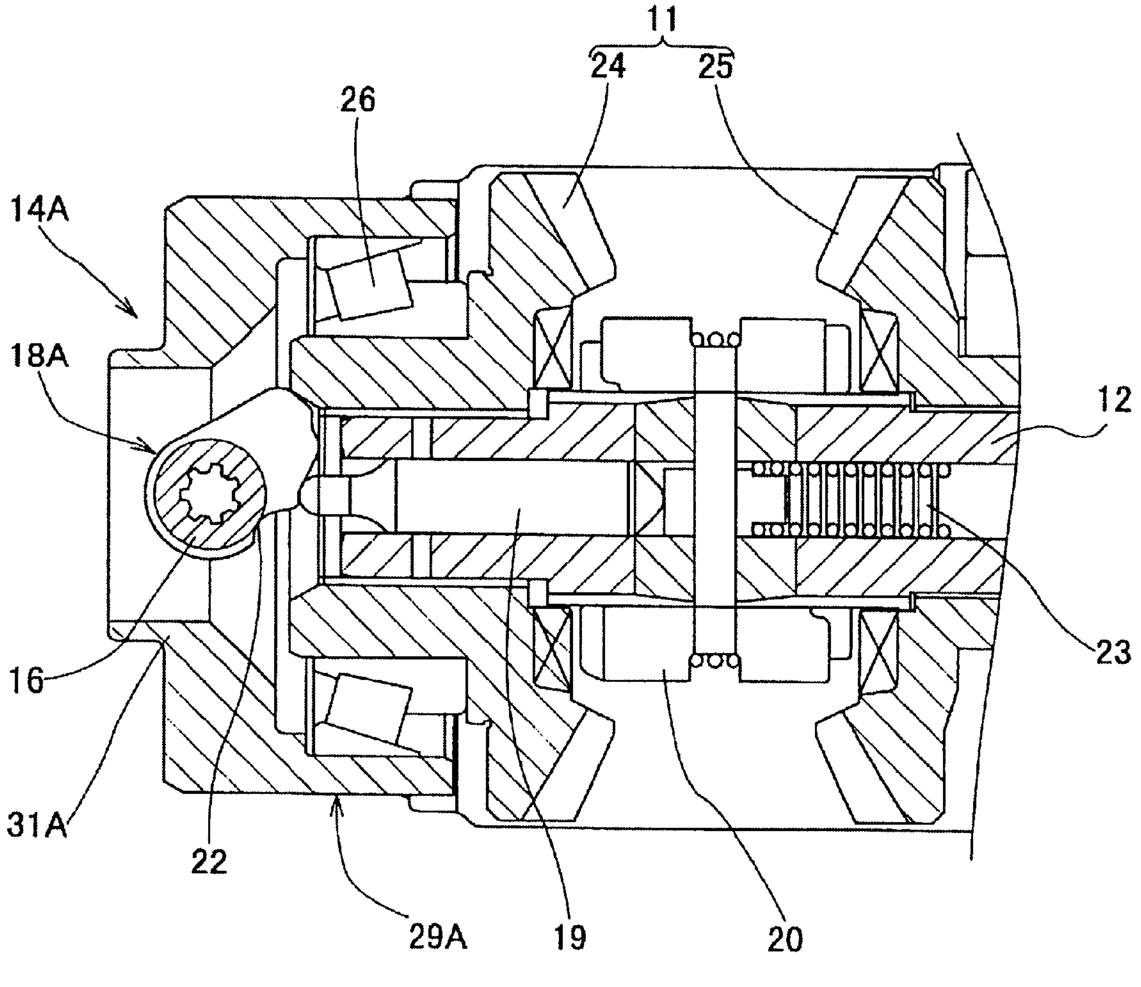
FIG. 3 is a sectional view taken along the line III—III of FIG. 2.

Referring now to FIGS. 2 and 3, the shift mechanism 14A of this embodiment has major parts including a shift rod 15, a shift rod 16, an assist device 17, a shift cam 18A, a push rod 19 and a shift dog 20. This shift mechanism is a rotary-type mechanism which effects the change-over of the shift position through horizontal rotation of the shift cam 18A.

The shift rod 15 extends towards the gear case 10 from, for example, a position in the engine cover 7 near the engine unit 3. The shift rod 15 is connected to the shift rod 16 via an assist device 17 which is disposed in the portion of the gear case 10 adjoining the drive shaft housing 8 and which incorporates a detent mechanism 21. When an operator on board manipulates a shift lever (not shown) or the like, the motion of the shift lever is converted into a rotational motion of the shift rod 15 which is then transmitted to the shift rod 16.

The shift cam 18A is fixed to the lower end of the shift rod 16 to rotate together with the shift rod 16. As will be seen from FIG. 3, the shift cam 18A has a cam profile composed of three consecutive curved recesses 22 which respectively correspond to the "forward" (F), "neutral" (N) and the "reverse" ®) shift positions. These recesses have bottoms that are at different radial directions from the axis of rotation of the shift cam 18A. The push rod 19 is received in a bore formed in the propeller shaft 12, so as to be movable in the direction of the axis of the propeller shaft 12. The push rod 19 is always biased by a spring 23 against the shift cam 18, so that the end of the push rod 19 is urged into one of the recesses 21 of the shift cam 18A, whereby the shift mechanism 14 is set to one of the three shift positions.

The aforementioned bevel gears 11 include a forward driven gear 24 and a reverse driven gear 25 which are rotatably carried by the propeller shaft 12 through bearings 26 and 27. These driven gears 24 and 25 are always held in driving engagement with a drive gear 28 fixed to the lower end of the drive shaft 9. The shift dog 20 on the outer peripheral portion of the propeller shaft 12 drivingly connects either one of the forward driven gear 24 and the reverse driven gear 25 to the propeller shaft 12, while disconnecting the other from the same, in accordance with the axial position of the push rod 19. The shift dog 20 also holds the shift mechanism 14 in the neutral state in which both the forward and reverse driven gears 23 and 24 are freed from the propeller shaft 12.

As will be seen from FIGS. 2 and 3, the bearing 26 which supports the forward driven gear 24 of the bevel gears 11 is held by a forward gear bearing housing 29A which is a supporting member detachably secured to the gear case 10. Likewise, the bearing 27 which supports the reverse driven gear 25 of the bevel gears 11 is held by a reverse gear bearing housing 30 which is detachably secured to the gear case 10. The forward gear bearing housing 29A has an integral support portion 31 A which supports the shift cam 18A.

Figure 4:
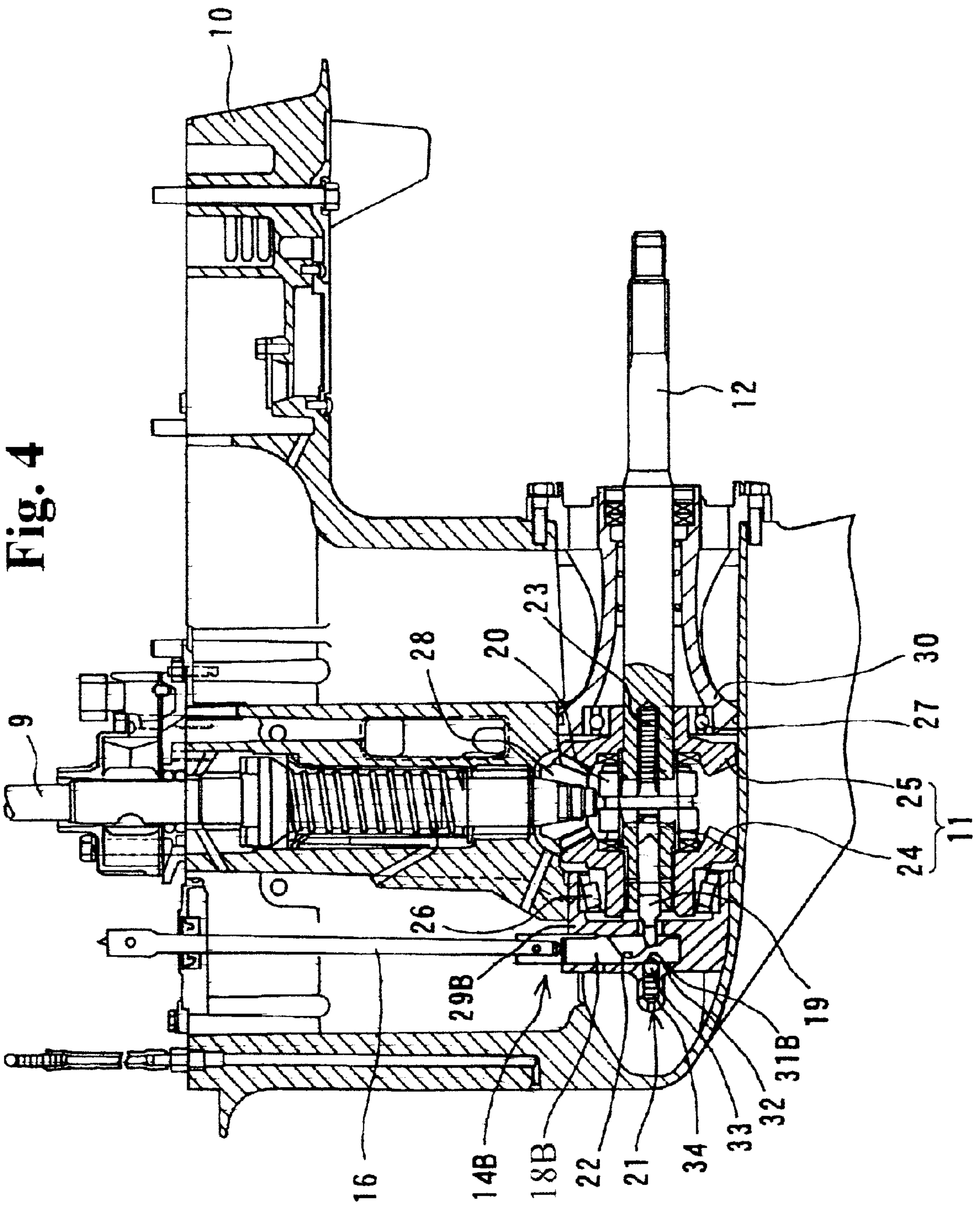
FIG. 4 is an enlarged sectional view of a gear case used in a second embodiment of the present invention.

Referring now to FIG. 4, a shift mechanism 14B of the second embodiment has major components such as a shift rod (not shown), a shift rod 16, a shift cam 18B, a push rod 19 and a shift dog 20. This shift cam mechanism is a vertical-motion-type mechanism in which the shift cam 18B is moved up and down.

The shift cam 18B is integrally attached to the lower end of the shift rod 16. The shift cam 18B has a rear face which includes a can profile having three consecutive recesses 22. An end of the push rod 19 engage one of the three recesses 22 of the shift cam 18B as the shift cam 18B is moved up or down.

The bearing 26, which supports the forward driven gear 24 of the bevel gears 11, is held by a forward gear bearing housing 19B which is a support member detachably secured to the gear case 10. Likewise, the bearing 27 which supports the reverse driven gear 25 of the bevel gears 11 is held by a reverse gear bearing housing 30 which is detachably secured to the gear case 10. The forward gear bearing housing 29B includes an integrally formed support portion 31B which supports the shift cam 18B. The support portion 31B is provided with the detent mechanism 21.

The detent mechanism 21 provided means for holding the shift cam 18B in the neutral position. For instance, the detent mechanism 21 may include a rigid ball 33 which is urged by a spring 34into a recess 32 the front side of the shift cam 18B.

Figure 5:
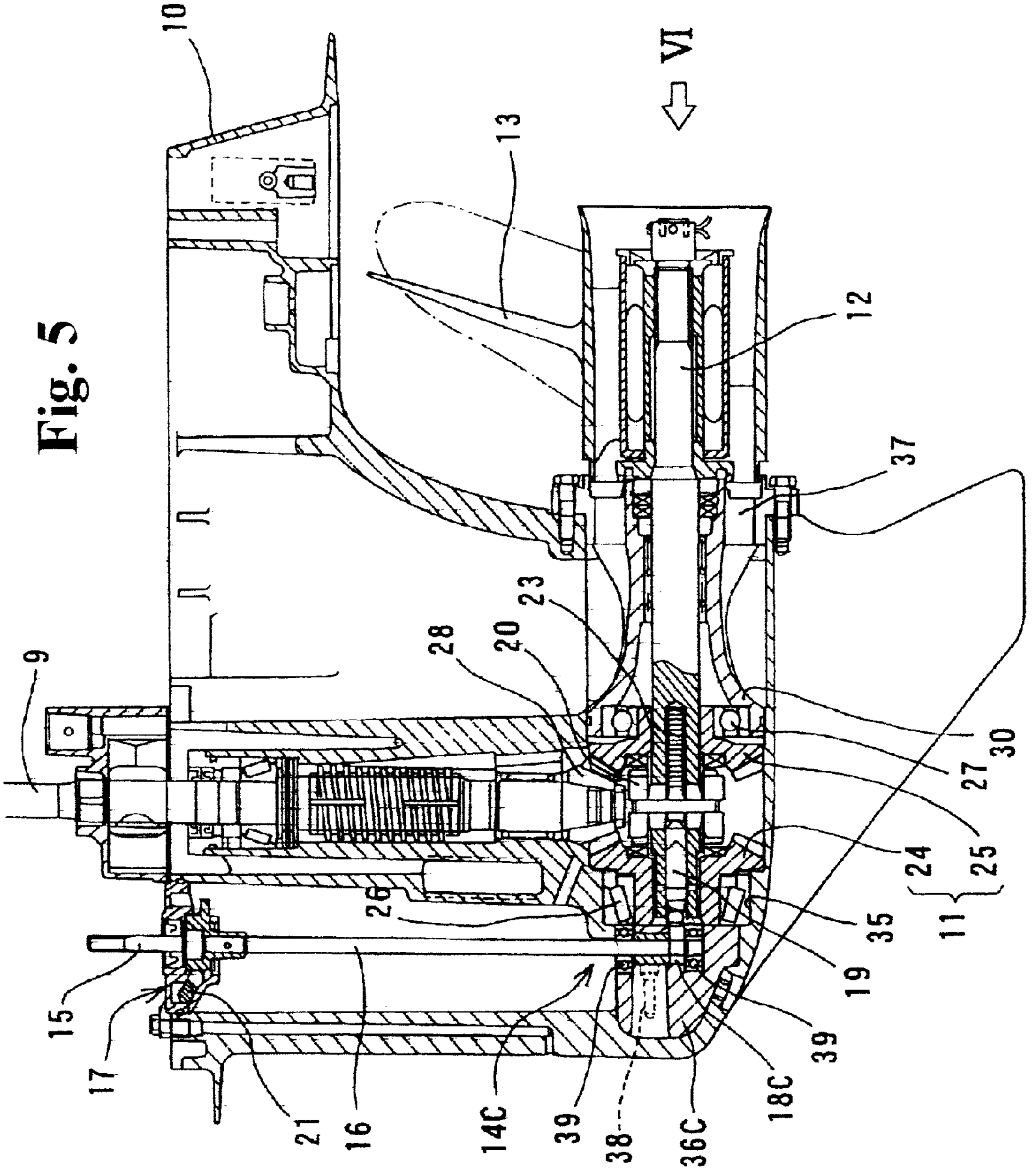
FIG. 5 is an enlarged sectional view of a gear case used in a third embodiment of the present invention.
Figure 6:
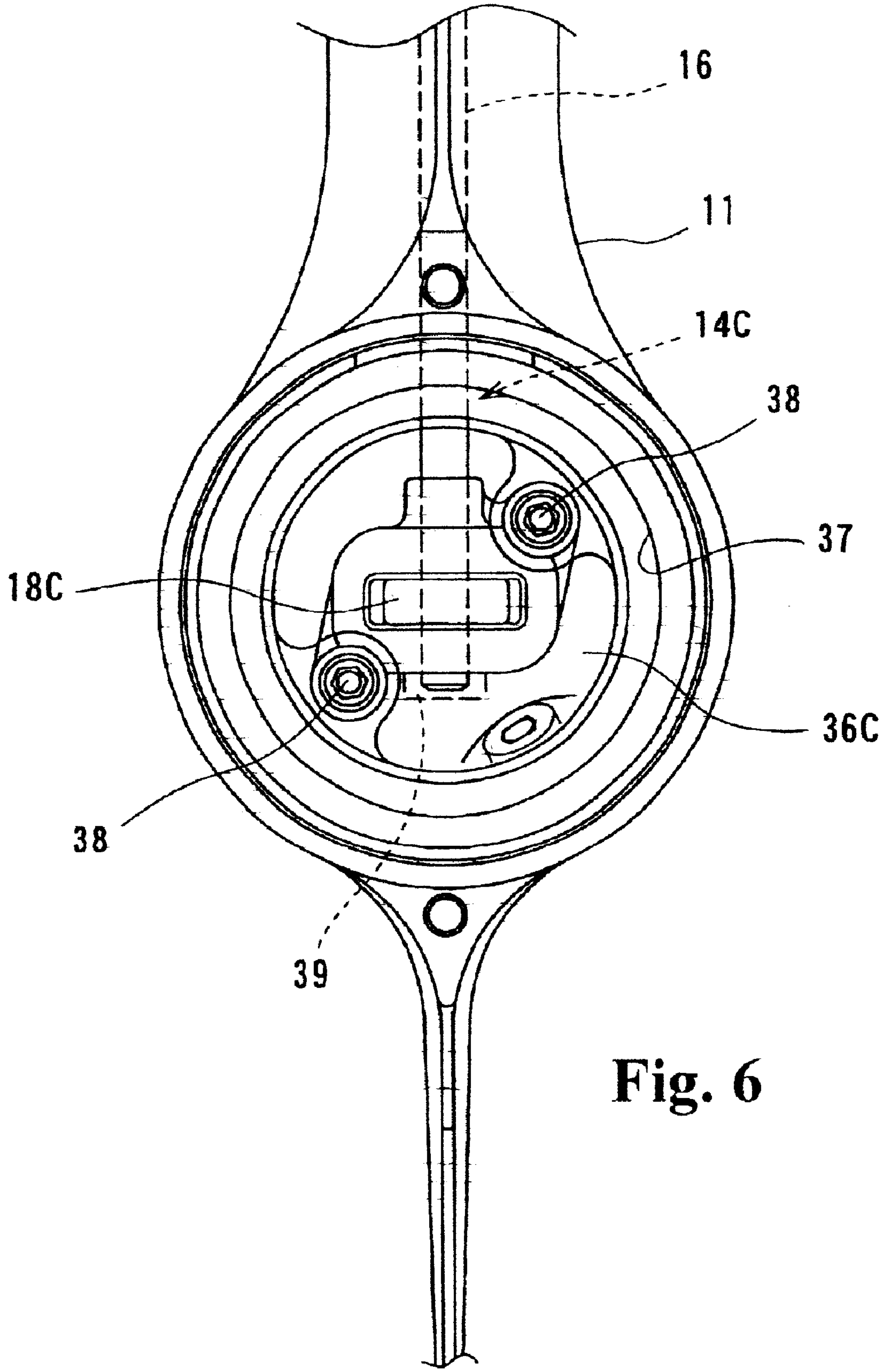
FIG. 6 is an illustration of the gear case of FIG. 5 as viewed in the direction of an arrow VI.

Referring now to FIGS. 5 and 6, the shift mechanism 14C of the third embodiment is a rotary-type mechanism which is similar to the shift mechanism 14A of the first embodiment. The embodiment of FIGS. 5 and 6 differs from the first embodiment in the following respects. In the first embodiment, the bearing 26 in support of the forward driven gear 24 of the bevel gears 11 is held by the forward gear bearing housing 29A which is detachably secured to the gear case 10, and the support portion 31A for supporting the shift cam 18A is integrally formed on the forward gear bearing housing 29A. In contrast, in the shift mechanism of the third embodiment, the bearing 26 in support of the forward driven gear 24 fits in a mating portion 35 formed in the gear case 10 integrally therewith, while the shift cam denoted by 18C is supported by a shift cam housing 36C which is a support member formed as a member separate from the gear case 10.

For instance, the arrangement may be such that the shift cam housing 36C is inserted toward the front into the gear case 10 through a shaft hole 37 formed in a rear part of the gear case 10 and is detachably secured to the gear case by means of, for example, bolts 38.

The shift cam housing 36C is inserted into the gear case 10 after the shift cam 18C is mounted in the shift cam housing 36C. After the insertion and fixation of the shift cam housing 36C, the shift rod 16 is inserted downward into the gear case 10 and is connected to the shift cam 18C. The shift cam housing 36C is provided therein with a bearing 39 that supports the shift rod 16.

Figure 7:
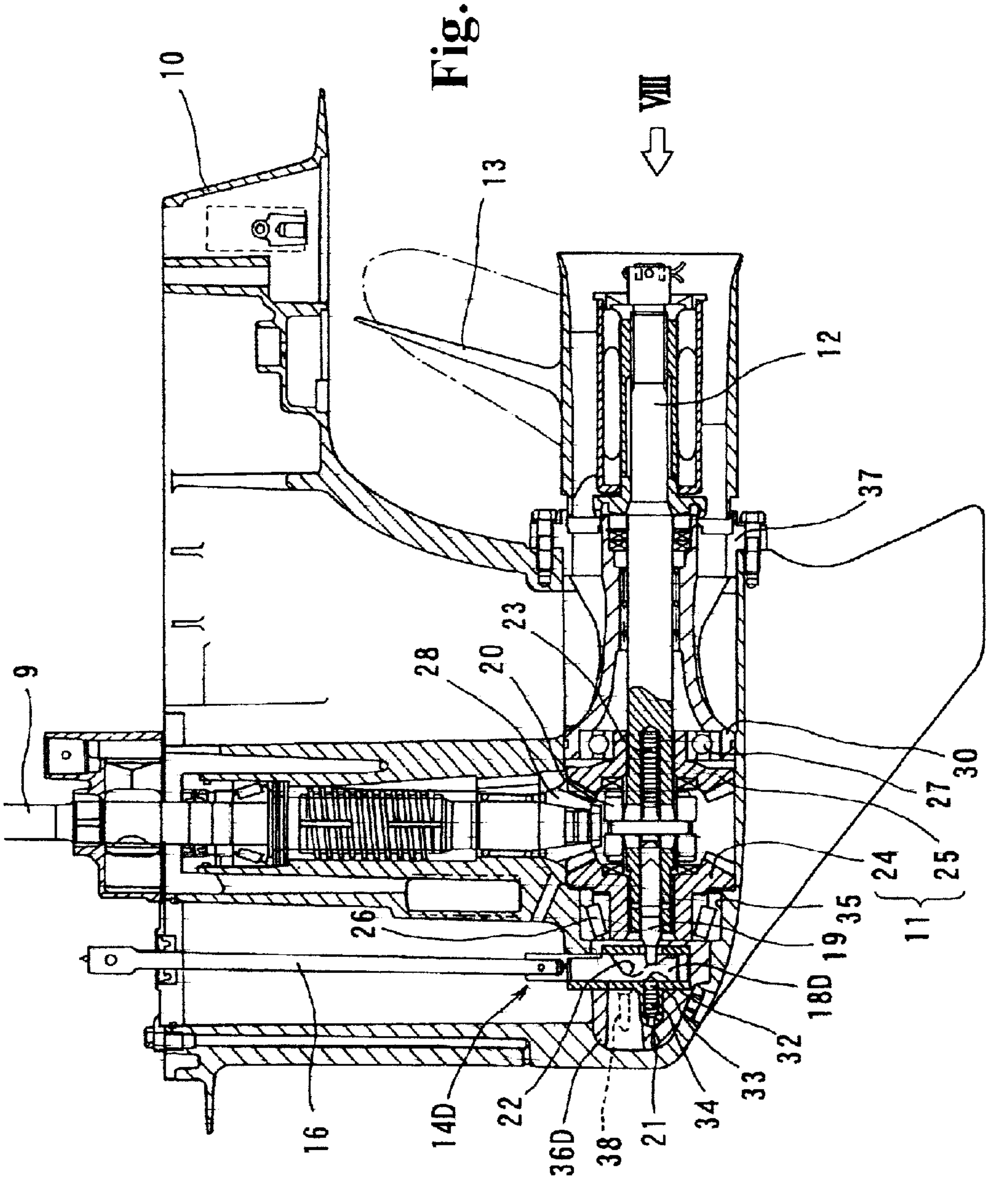
FIG. 7 is an enlarged sectional view of a gear case used in a fourth embodiment of the present invention.
Figure 8:
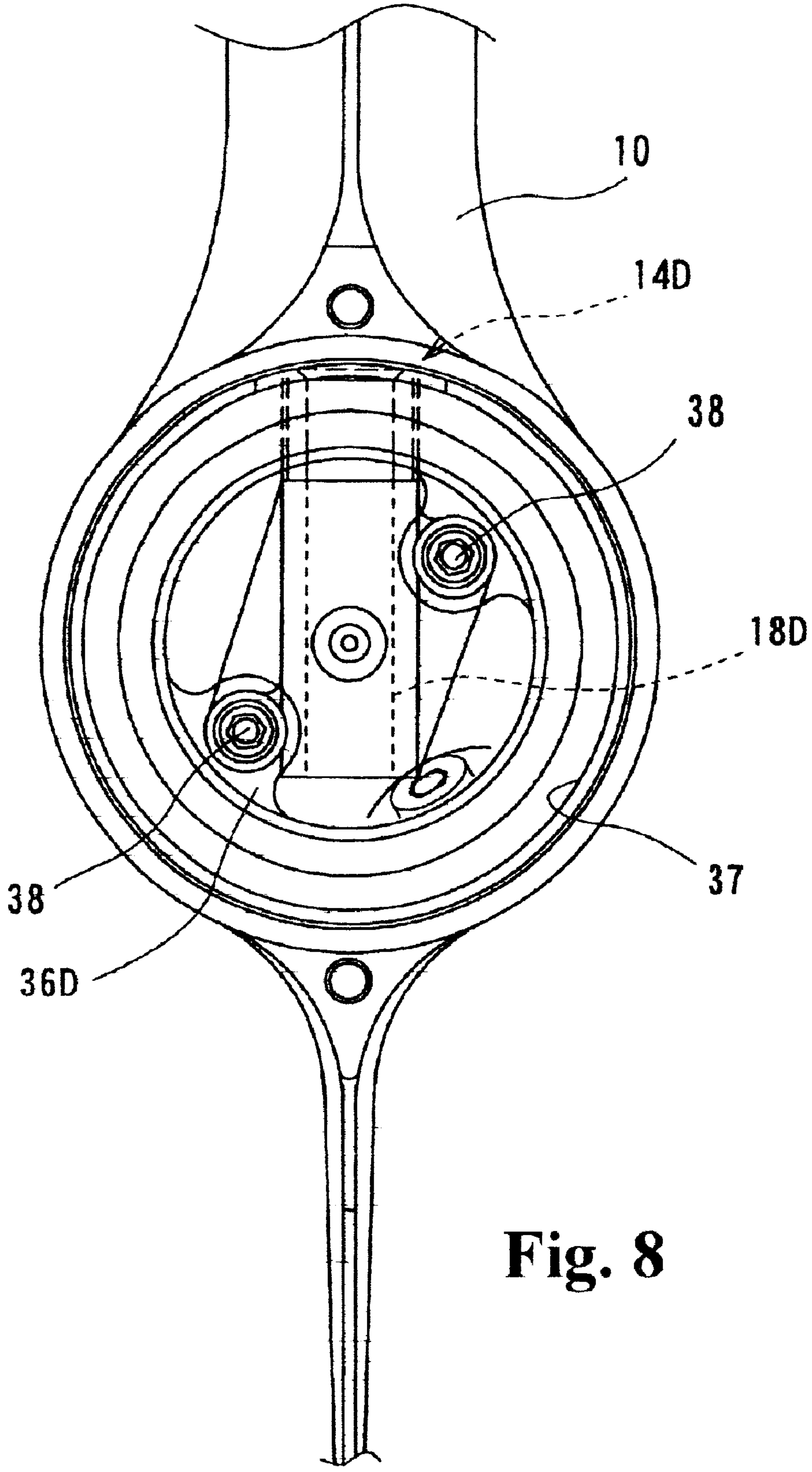
FIG. 8 is an illustration of the gear case of FIG. 7 as viewed in the direction of an arrow VIII.

Referring now to FIGS. 7 and 8, a shift mechanism of the fourth embodiment, denoted by 14D, is of the vertical-motion-type mechanism which is similar to shift mechanism 14B of the second embodiment.

The fourth embodiment is distinguished from the second embodiment in the following respects. In the second embodiment, the bearing 26 in support of the forward driven gear 24 of the bevel gears 11 is held by the forward gear bearing housing 29B which is detachably secured to the gear case 10, and the support portion 31B for supporting the shift cam 18B is integrally formed on the forward gear bearing housing 29B. In contrast, in the shift mechanism of the fourth embodiment, the bearing 26 in support of the forward driven gear 24 fits in a mating portion 35 formed in the gear case 10 integrally therewith, while the shift cam denoted by 18D is supported by a shift cam housing 36D which is a support member formed as a member separate from the gear case 10.

For instance, the arrangement may be such that the shift cam housing 36D is inserted forwardly into the gear case 10 through the shaft hole 37 formed in a rear part of the gear case 10 and is detachably secured to the gear case by means of, for example, bolts 38.

When the shift cam housing 36D is inserted into the gear case 10, the shift cam 18D has been mounted in the shift cam housing 36D. After the insertion and fixation of the shift cam housing 36D, the shift rod 16 is inserted downward into the gear case 10 and is connected to the shift cam 18D. The shift cam housing 36D is provided with a detent mechanism 21 which is similar to that used in the second embodiment.

A description will now be given of the operations of the illustrated embodiments.

An operator of a boat manipulates a shift lever (not shown) of, for example, the shift mechanism 14A of the first embodiment (FIG. 2), so that the shift rod 15 and, hence, the shift rod 16 are rotated, thereby rotating the shift cam 18A fixed to the lower end of the shift rod 16. As a result of the rotation of the shift cam 18A, the end of the push rod 19 that has been held in engagement with one of the recesses 22 is caused to engage another recess 22 adjacent to the first-mentioned recess 22. Since the radial distances of the bottoms of these recesses 22 from the axis of rotation of the shift cam 18 are different, the push rod 19 is moved within the propeller shaft 12 along the axis of the propeller shaft, thereby selectively connecting one of the bevel gears 11 with the propeller shaft or disconnecting these bevels gears 11 from the propeller shaft.

In the first embodiment as described, as well as in the second embodiment, the forward gear bearing housing 29A (29) for holding the bearing 26 in support of the forward driven gear 24 of the bevel gears 11 is detachably secured to the gear case 10, and the support portion 31A (311B) for supporting the shift cam 18A (18B) is integrally formed on the forward gear bearing housing 29A (29B). With this arrangement, a single gear case 10 can be adapted for either of the two different types of the shift cam, i.e., the rotational shift cam and the vertically-movable shift cam, simply by replacing the forward gear bearing housing 29A (29B).

In the third embodiment as described, as well as in the fourth embodiment, the bearing 26 in support of the forward driven gear 24 fits in the mating portion 35 formed in the gear case 10 integrally therewith, and the shift cam 18C (18D) is supported by the shift cam housing 36C (36D) which is formed as a member separate from the gear case 10. With this arrangement, a single gear case 10 is adapted for either of the two different types of the shift cam, i.e., the rotational shift cam and the vertically-movable shift cam, simply by replacing the shift cam housing 36C (36D).

As will be understood from the foregoing description, according to the present invention, different types of the shift cam (rotational shift cam and vertically-movable shift cam) are easily assembled with the same design of he gear case 10, because the shift cam 18A(18B, 18C, 18D) is supported by a shift cam support member, i.e., the forward gear bearing housing 29A(29B) or the shift cam housing 36C(36D), which is prepared as a member separate from the gear case 10 and detachably secured to the gear case 10.

This eliminates the necessity for the two different types of gear case 10 which hitherto have been necessarily prepared corresponding to two types of shift cams 18A, 18C and 18B, 18D. Thus, the manufacturers are required to prepare only one type of the gear case and, hence, can save the cost that has been incurred for the molding of two types of the gear case. At the same time, it becomes unnecessary to assign two different parts numbers that have been employed to enable identification of the two types of gear case. This also eliminates the necessity for two different storage spaces for the gear case, thus facilitating storage and administration of the gear cases.

As stated before, a problem occurs when the space inside the engine room is reduced by a change in the design specifications of the outboard engine 1, so that the space for accommodating a link mechanism (not shown) associated with the vertical-motion-type shift cam 18B(18D) is not available in the engine room. This problem, however, is easily overcome by the present invention which permits replacement of the vertical-motion-type shift cam 18B(18D) with a rotary shift cam 18A(18C) simply by the replacement of the forward gear bearing housing 29A(29B) or the shift cam housing 36C(36D). This effectively serves to reduce the production cost.

Furthermore, in accordance with the present invention, a member which is separate from and detachably secured to the gear case 10, i.e., the forward gear bearing housing 29A(29B) or the shift cam housing 36C(36D), supports the shift cam 18A(18C) or 18B(18D). This simplifies the arrangement of cores of the mold for molding the gear case 10, thus contributing to further reduction in the production cost.

Referring specifically to the third and fourth embodiments, the assembly of the shift mechanism is facilitated and the time required for the assembly work is shortened, because the shift mechanism can be completed by forwardly inserting the shift cam housing 36C(36D) together with the shift cam 18C(18D) mounted therein and fixing the shift cam housing 36C(36D) to the gear case 10, through the shaft hole 37 formed in the rear part of the gear case 10, followed by the insertion and connection of the shift rod 16 to the shift cam 18C(18D) from the upper side of the gear case 10.

In the third embodiment as described, the shift cam housing 36C which is in support of the rotary shift cam 18C is provided therein with the bearing 39 for supporting the shift rod 16. This ensured smooth rotation of the shift rod 16, as well as rigidity of the supporting structure, thus offering better feel of the shifting operation.

In the second embodiment, as well as in the third embodiment, the shift cam 18B(18C) can stably be set in the neutral position with a good click feel, by virtue of the detent mechanism 21 which is provided on the support portion 31B of the forward gear bearing housing 29B supporting the vertically-movable shift cam 18B, or on the shift cam housing 36D which supports the vertically-movable shift cam 18D.

Although in the third and fourth embodiments the shift cam housing 36C(36D) is inserted into the gear case 10 through the shaft hole 37 formed in the rear portion of the gear case 10, this is not exclusive and the shift mechanism may be assembled by inserting the shift cam housing 36C (36D) downward into the gear case 10, through the top end opening of the gear case 10 at which the gear case 10 is adjoined to the drive shaft housing 8.

As will be understood from the foregoing description, in accordance with the present invention, there is provided a shift mechanism of an outboard engine, comprising: a remotely-operable shift cam for effecting change-over of the direction of rotation of a propeller shaft within a gear case; and a shift cam support member disposed in the gear case and detachably secured to the gear case and supporting the shift cam, the shift cam support member being, for example, a forward gear bearing housing for holding a bearing which supports a forward driven gear, or a shift cam housing which is a member formed separately from and detachably secured to the gear case. With this arrangement, a single design of the gear case can easily be adapted to different types of the shift cam, i.e., a rotational shift cam or a vertically-movable shift cam. This contributes to the reduction in the production cost, while simplifying and facilitating the work for storing the gear cases, as well as the administration of the assembly process.

In a preferred form of the present invention, the shift mechanism further comprises a detent mechanism provided on the shift cam support member. This ensures that the shift mechanism is stably set to and held in the neutral state with good feel of click.

The shift mechanism can further have a bearing which is provided in the shift cam housing and which supports a shift rod for rotating the shift cam. The bearing offers an improved feel in the shifting operation.

Preferably, the shift cam mechanism has been assembled by inserting the shift cam housing together with the shift can mounted therein, forwardly into the gear case and detachably securing the shift cam housing to the gear case. This assembly process improves the efficiency of the assembly work, while shortening the time required for the assembly.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A shift mechanism of an outboard engine comprising:

a gear case;

a remotely-operable shift cam for effecting change-over of a direction of rotation of a propeller shaft within said gear case;

a shift cam support member disposed in said gear case and detachably secured to said gear case and supporting said shift cam; and said shift cam support member includes a forward gear bearing housing for holding a bearing which supports a forward driven gear.

2. A shift mechanism of an outboard engine according to claim 1, wherein said shift cam support member comprises a shift cam housing which is a member formed separately from and detachably secured to said gear case.

3. A shift mechanism of an outboard engine according to claim 1, further comprising a detent mechanism on said shift cam support member.

4. A shift mechanism of an outboard engine comprising:

a gear case;

a remotely-operable shift cam for effecting change-over of a direction of rotation of a propeller shaft within said gear case;

a shift cam support member disposed in said gear case and detachably secured to said gear case and supporting said shift cam; and a detent mechanism on said shift cam support member.

5. A shift mechanism of an outboard engine comprising:

a gear case;

a remotely-operable shift cam for effecting change-over of a direction of rotation of a propeller shaft within said gear case;

a shift cam support member disposed in said gear case and detachably secured to said gear case and supporting said shift cam;

said shift cam support member including a shift cam housing which is a member formed separately from and detachably secured to said gear case; and a bearing in said shift cam housing and said bearing supporting a shift rod for rotating said shift cam.

* * * * *